Nov. 30, 1954  K. L. MAGEE  2,695,504
THREE-PART EXTENSIBLE SHAFT
Filed Jan. 19, 1951
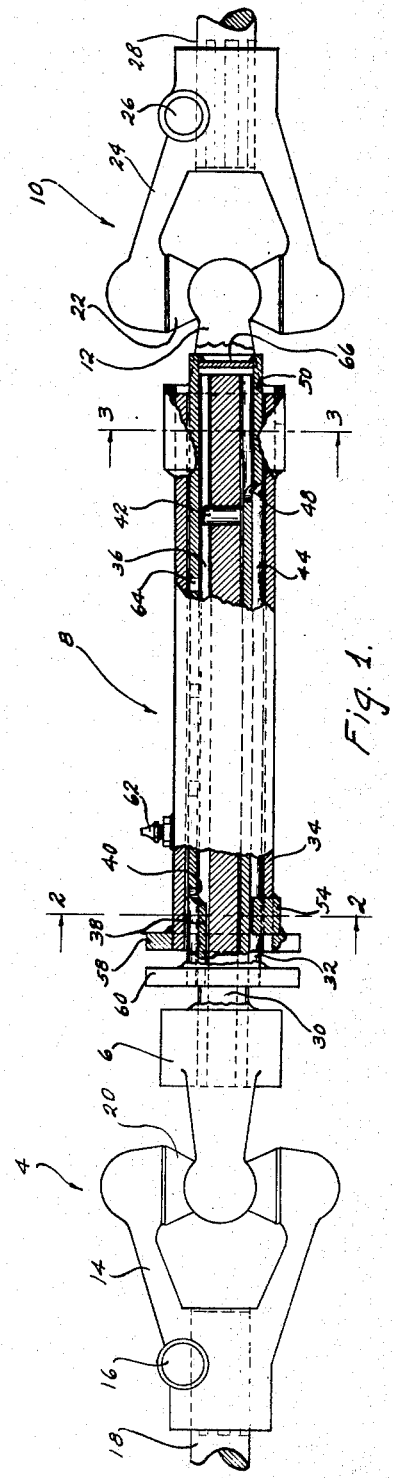
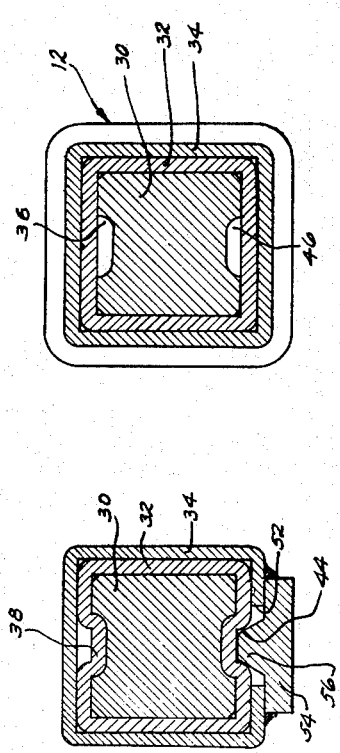
INVENTOR.
KENNETH L. MAGEE
BY
Emerson B Donnell
ATTORNEY

United States Patent Office 2,695,504
Patented Nov. 30, 1954

2,695,504

THREE-PART EXTENSIBLE SHAFT

Kenneth L. Magee, Burlington, Iowa, assignor to J. I. Case Company, Racine, Wis., a corporation of Wisconsin Application January 19, 1951, Serial No. 206,861

6 Claims. (Cl. 64—23)

The present invention relates to extensible shafts and an object thereof is to generally improve the construction and operation of devices of this class. A further object is to provide such a device which is extensible over a greater range than devices of heretofore known construction. A further object is to provide such a device which is inseparable, at least without destroying or permanently damaging the device so as to preclude the possibility of inadvertent separation of the constituents of the device while in operation and also whereby to prevent disassembly by tampering and consequent improper reassembly. Serious accidents have occurred by the inadvertent pulling apart of extensible power take-off shafts connected for example between a tractor and its drawn implement, notably when for some reason the coupling pin on the draw bar is either inadvertently omitted or is displaced or lost out while the outfit is in operation. In the present invention, any such mishap may merely result in extending the extensible shaft to the limit, the parts being so ruggedly constructed that the implement could readily be drawn by means of the power shaft for a short time so that the tractor could be stopped without danger or damage.

Further objects are to provide such a device which can be readily and economically manufactured from easily procurable materials, which can be readily lubricated and which is entirely suited for the accomplishment of the above objects.

Similar reference characters have been applied to the same parts throughout the specification and accompanying drawings in which:

Figure 1 is a side elevation partly in vertical axial section of a device embodying the invention.

Fig. 2 is an enlarged sectional view on the line 2—2 of Fig. 1.

Fig. 3 is an enlarged sectional view on the line 3—3 of Fig. 1.

As seen in Fig. 1, the complete device includes a universal joint or connecting device generally designated as 4 having an element 6, an assemblage generally designated as 8 of interconnected sections which will be fully described presently and a universal joint or connecting device generally designated as 10 and having an element 12. Universal joint 4 has another element 14 which in the present instance is attached by a fastening device 16 of well-known form to a shaft 18 forming part of a drawn implement not shown since it forms no part of the present invention, elements 6 and 14 being united by a cross 20 so as to form a working joint in a manner well understood in the art. In like manner universal joint element 12 is connected by a cross 22 to an element 24 which is connected by a fastening device 26 to a shaft 28, in the present instance constituting the well-known power take-off shaft of a tractor, also not shown since it forms no part of the present invention. Assemblage 8 connects universal joint elements 6 and 12 in mutually rotative relation while at the same time providing for variable axial spacing between said elements as required by shifting of shafts 18 and 28 relatively to each other.

Assemblage 8 comprises generally three interconnected telescoping sections, an inner section 30 of angular cross section, preferably although not necessarily square is permanently fixed to universal joint element 6 so as to rotate therewith and to be axially fixed in relation thereto. An intermediate section 32 is disposed immediately outside of inner member 30 and may conveniently consist of a piece of so-called square pipe which fits slidably but non-rotatably on the outside of section 30. Outside of intermediate section 32 is disposed an outer section 34, likewise conveniently a piece of square pipe which fits slidably but non-rotatably outside of intermediate section 32. Section 30 as above noted is fixed to universal joint element 6 while section 34 is fixed in relation to universal joint element 12 and as will be apparent, rotation of joint element 12 in response to rotation of power take-off shaft 28, will cause rotation of outer section 34, intermediate section 32, and inner section 30, rotation of the latter causing rotation of universal joint section 6 and therefore of implement shaft 18. As will also be apparent the axial separation of shafts 28 and 18 may be increased without breaking this driving relation, sections 32 and 30 readily sliding respectively with relation to sections 34 and 32 while the driving relation is maintained by virtue of the angular cross section of the parts. It will be apparent, however, that it is necessary to provide against excessive sliding of these parts since otherwise they might become entirely separated and constitute a source of damage or danger. For this purpose, stops are provided to limit the possible extension of the inter-engaged axially slidable parts.

In order to provide the necessary space so that the stops may be sufficiently rugged, inner section 30 provides a groove 36 into which in the present instance is indented a portion 38 of intermediate section 32, portion 38 being limited in length and disposed at the end of section 32 nearest universal joint element 6. The remainder of section 32 in the region of groove 36 is not indented but retains its original flat configuration as one side of the square pipe from which it was made. At the juncture between indented portion 38 and the remaining unindented portion of the wall of section 32, an opening 40, such as a drilled hole, is provided and which serves two important purposes. In the first place it releases the metal to be indented so that it may readily be forced down into the desired shape to form portion 38 without being undesirably supported by the remainder of the wall of portion 32. Also opening 40 provides a desirable terminal wall or abutment for stop portion 38. Groove 36 in inner section 30, toward the end thereof remote from universal joint element 6, has a stop in the present instance in the form of a pin 42 which encumbers groove 36 to such an extent as to intercept the wall of opening 40 on stop portion 38 in the event that inner portion 30 is pulled out of intermediate portion 32 to a sufficient extent. Beyond this point, further extension of assemblage 8 will require intermediate portion 32 to move relatively to outer portion 34 in consonance with portion 30 this is caused by engagement of stop portion 42 with the wall of opening 40, further extension causing sliding of intermediate portion 32 out of outer portion 34, which, of course, remains axially stationary, being fixed to universal joint element 12 which latter is carried by the other parts of the universal joint 10 fixed on the power take-off shaft 28. It will be noted that stop portion 42 and also stop portion 38 are exceptionally rugged, and easily made so in view of the particular shape and characteristics of the parts. Other stop means than a pin are contemplated as useful in the invention, pin 42, however, being a convenient, economical and satisfactory member to serve the desired purpose.

As will be apparent, a somewhat similar arrangement is needed to prevent withdrawal of intermediate section 32 entirely from outer section 34. This involves a groove 44 in intermediate section 32 which is best provided by indenting the wall of section 32. Space for such indenting is provided in inner section 30 by means of a groove 46 into which a portion of the wall of section 32 is indented as best seen in Fig. 2 to form above mentioned groove 44. Groove 44 extends through the major section of the length of intermediate portion 32 but terminates in an opening 48 which, in a manner similar to above described opening 40 relieves the metal of portion 32 from the remaining portion 50 which encumbers groove 44 and acts as a stop for engaging a complementary stop on outer section 34 to be described.

While varying expedients are contemplated for a stop on section 34, in the present instance section 34 has an opening 52, best seen in Fig. 2, in which is seated a key or stop member 54 having a tongue portion 56 extending through opening 52 and engaging in groove 44. Key 54 is disposed in a region remote from above mentioned universal joint element 12 so as to be encountered by the wall of opening 48 when section 32 is extended to the desired maximum amount.

In order to make a very strong and rugged connection, key 54 is placed substantially in contact with a reinforcing collar 58 which surrounds the end of outer section 34 remote from universal joint element 12 and which is securely welded or otherwise permanently fastened to section 34. Collar 58 also serves to prevent distortion of the open end of section 34 under the very considerable driving stresses. In like manner and for a similar purpose, a collar 60 is disposed about the end of intermediate section 32.

A lubricating fitting of well-known form 62 is mounted on outer section 34 preferably in the region of key 54 so as to register with a part of the exterior of intermediate section 32 when the assemblage 8 is fully extended. Grease may be fed between sections 34 and 32 by means of fitting 62 and openings at 64 are provided in section 32 so that some of this grease may pass through into the space between intermediate section 32 and inner section 30. Thus the sliding surfaces of the interengaged portions are thoroughly and easily lubricated. A plug 66 is preferably provided to close the end of intermediate section 32 remote from collar 60 so that grease accumulating inside of section 32 will not be forced out but will be compelled to distribute itself about inner section 30.

The operation of the device is thought to be clear from the above description, it being apparent that rotation of universal joint 10 will cause equivalent rotation of universal joint 4 while the axial distance between joints 10 and 4 may be varied and increased to a very considerable extent without in any way impairing the driving relation. Furthermore, the amount of extension is definitely limited by the stops 40, 42, 48 and 54, while the device is readily fabricated from easily procurable standard rolled shapes and made rugged enough so that there is virtually no chance of the device being pulled apart in operation to cause damage or danger.

The above being a complete description of an illustrative embodiment of the invention what is claimed as new and desired to be secured by Letters Patent of the United States is:

1. In an extensible shaft construction for a tractor implement connection the combination of at least three interconnected telescoping sections of angular cross section including an inner section, an intermediate section and an outer section, a power transmitting element attached to one end of said inner section and a second power transmitting element attached to the end of said outer section remote from the first mentioned power transmitting element and means to maintain said sections in permanent interconnection with each other to provide for predetermined extension of said interconnected telescoping sections while preventing complete separation of any one section from the assemblage of sections, said inner section providing a plurality of circumferentially spaced longitudinally extending grooves in outer sides thereof, said inner section providing a stop in one of said grooves, said stop comprising a pin and disposed in obstructing relation in said groove adjacent the end of said inner section remote from said first mentioned power transmitting element, said intermediate section having a stop engaged with the first mentioned groove in said inner section in position to encounter said pin when the assemblage is extended a predetermined distance, and comprising an indented portion of said intermediate section, said intermediate section having a portion indended into the other groove in said inner section and providing a groove in the outer surface of said intermediate section, stop means at the end of said intermediate section remote from said first mentioned power transmitting element and comprising a portion of the wall of said intermediate section, stop means within the outer section remote from said second power transmitting element and comprising a key member fixed in relation to said outer section, said outer section providing an opening and said key member being permanently attached to the outside of said outer section and projecting through said opening into the groove in said intermediate section in position to encounter said wall portion when the assemblage is extended to a predetermined position, a grease fitting mounted on said outer section and providing a passageway leading to the space between said outer and said intermediate sections, an opening in said intermediate section for the passage of grease from said space to the space between said intermediate and said inner sections and a plug closing the end of said intermediate section remote from the stop portion of said intermediate section.

2. In an extensible shaft construction for a tractor implement connection the combination of at least three interconnected telescoping sections of angular cross section including an inner section, an intermediate section and an outer section, a connecting device attached to one end of said inner section and a second connecting device attached to the end of said outer section remote from the first mentioned connecting device and means to maintain said sections in permanent interconnection with each other to provide for predetermined extension of said interconnected telescoping sections while preventing complete separation of any one section from the assemblage of sections, said inner section providing a plurality of circumferentially spaced longitudinally extending grooves in outer sides thereof, said inner section providing a stop in one of said grooves, said stop comprising a pin and disposed in obstructing relation in said groove adjacent the end of said inner section remote from said first mentioned connecting device, said intermediate section having a stop engaged with the first mentioned groove in said inner section in position to encounter said pin when the assemblage is extended a predetermined distance, and comprising an indented portion of said intermediate section, said intermediate section having a portion indented into the other groove in said inner section and providing a groove in the outer surface of said intermediate section, stop means at the end of said intermediate section remote from said first mentioned connecting device and comprising a portion of the wall of said intermediate section, stop means within the outer portion remote from said second connecting device and comprising a key member fixed in relation to said outer section, said outer section providing an opening and said key member being permanently attached to the outside of said outer section and projecting through said opening into the groove in said intermediate section in position to encounter said wall portion when the assemblage is extended to a predetermined position.

3. In an extensible shaft construction for a tractor implement connection the combination of at least three interconnected telescoping sections of angular cross section including an inner section, an intermediate section and an outer section, a power transmitting element attached to one end of said inner section and a second power transmitting element attached to the end of said outer section remote from the first mentioned power transmitting element and means to maintain said sections in permanent interconnection with each other to provide for predetermined extension of said interconnected telescoping sections while preventing complete separation of any one section from the assemblage of sections, said inner section providing a plurality of circumferentially spaced longitudinally extending grooves in outer sides thereof, said inner section providing a first stop in one of said grooves, said stop being disposed in obstructing relation in said groove adjacent the end of said inner section remote from said first mentioned power transmitting element, said intermediate section having a second stop engaged with the first mentioned groove in said inner section in position to encounter the first stop when the assemblage is extended a predetermined distance, said intermediate section having a portion indented into the other groove in said inner section and providing a groove in the outer surface of said intermediate section, a third stop means at the end of said intermediate section remote from said first mentioned power transmitting element and being disposed in obstructing relation to the last mentioned groove, a fourth stop means within the outer section remote from said second power transmitting element and projecting into the groove in said intermediate section in position to encounter said third stop when the assemblage is extended to a predetermined position, a grease fitting mounted on said outer section and providing a passageway leading to the space between said outer and said intermediate sections, an opening in said intermediate section for the passage of grease from said space to the space between said intermediate and said inner sections and a plug closing the end of said intermediate section remote from the second stop portion.

4. In an extensible shaft construction for a tractor implement connection the combination of at least three interconnected telescoping sections of angular cross section including an inner section, an intermediate section and an outer section, a power transmitting element attached to one end of said inner section and a second power transmitting element attached to the end of said outer section remote from the first mentioned power transmitting element and means to maintain said sections in permanent interconnection with each other to provide for predetermined extension of said interconnected telescoping sections while preventing complete separation of any one section from the assemblage of sections, said inner section providing a plurality of circumferentially spaced longitudinally extending grooves in outer sides thereof, said inner section providing a first stop in one of said grooves, said stop being disposed in obstructing relation in said groove adjacent the end of said inner section remote from said first mentioned power transmitting element said intermediate section having a second stop engaged with the first mentioned groove in said inner section in position to encounter the first stop when the assemblage is extended a predetermined distance, said intermediate section having a portion indented into the other groove in said inner section and providing a groove in the outer surface of said intermediate section, a third stop means at the end of said intermediate section remote from said first mentioned power transmitting element and being disposed in obstructing relation to the last mentioned groove, and a fourth stop means within the outer section remote from said second power transmitting element and projecting into the groove in said intermediate section in position to encounter said third stop when the assemblage is extended to a predetermined position.

5. In an extensible shaft, a section comprising a tubular member having a longitudinal wall portion providing an opening therethrough intermediate the ends of the tubular member, said wall being formed with a longitudinally extending reentrant portion providing an exterior groove and an interior rib in said longitudinal wall portion, an outer section disposed about and in telescoping relation to said tubular member and having an internal stop projecting into said groove, said reentrant portion extending from one end of the section to, and terminating in, said opening so that the margin of said opening remote from said reentrant portion forms a stop portion disposed across said external groove and intermediate the ends of said section in position to encounter the first-mentioned stop portion when said tubular member is extended from said outer section in one direction a predetermined amount.

6. In an extensible shaft a section comprising a tubular member having a longitudinal wall portion providing an opening therethrough, intermediate the ends of the tubular member, said wall being formed with a longitudinally extending indented portion providing an interior rib, an inner section disposed in telescoping relation to said tubular member and having a longitudinal groove into which said rib projects, a stop in said groove fixed in relation to said inner section, said indented portion extending from one end of the section to, and terminating in said opening so that the margin of said opening proximate said indented portion forms a stop portion disposed across said groove and intermediate the ends of said section in position to encounter the first mentioned stop when said inner section is extended from said tubular member in one direction a predetermined amount.

References Cited in the file of this patent

UNITED STATES PATENTS

| Number | Name | Date |
|---|---|---|
| 73,914 | Moul | Jan. 28, 1868 |
| 1,784,436 | Hadley | Dec. 9, 1930 |
| 2,072,090 | Anderson | Mar. 2, 1937 |
| 2,199,926 | Swennes | May 7, 1944 |